J. HINTON.
Clover Harvester.
No. 6,475.
Patented May 22, 1849.
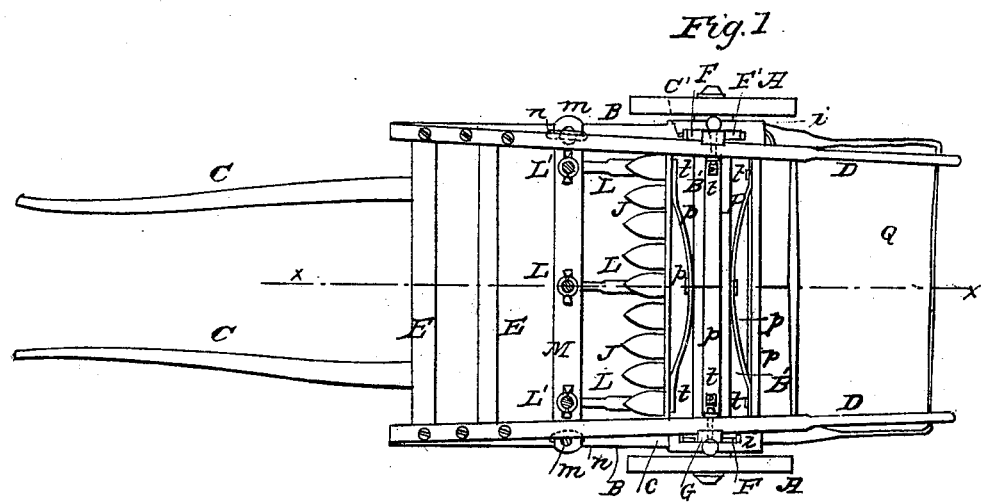
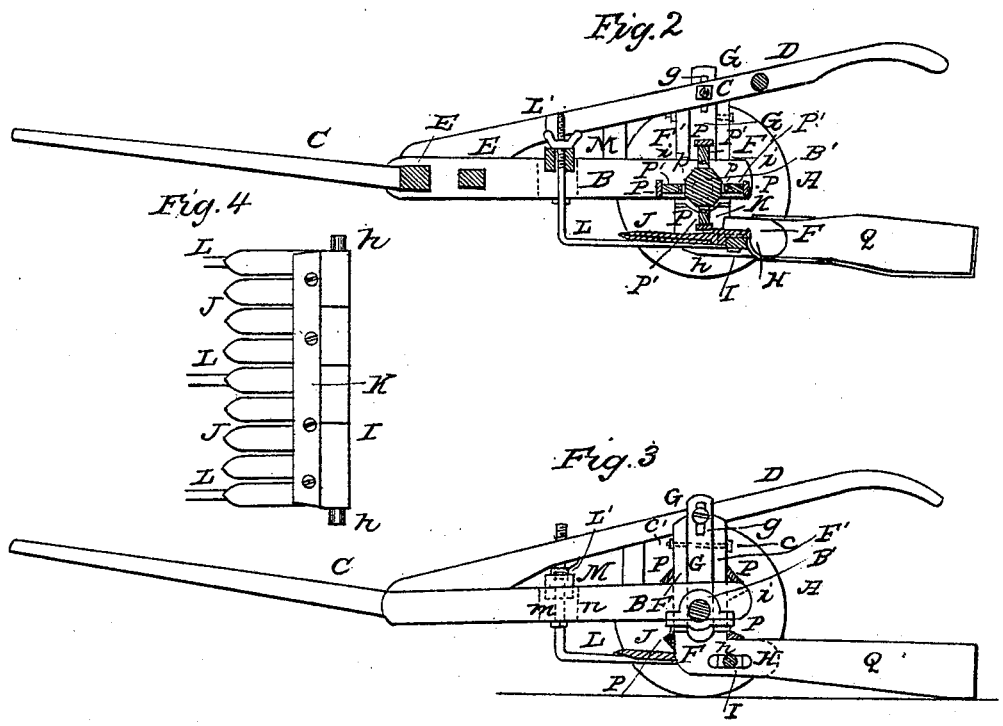

UNITED STATES PATENT OFFICE.

JOHN HINTON, OF MONROE COUNTY VIRGINIA.

HARVESTER OF CLOVER-HEADS.

Specification forming part of Letters Patent No. 6,475, dated May 22, 1849; Reissued August 13, 1850, No. 173.

*To all whom it may concern:*

Be it known that I, JOHN HINTON, of near Pack's Ferry, in the county of Monroe and State of Virginia, have invented a new and useful Improvement in the Machine for cutting and Gathering Clover-Heads, which I denominate the "Clover-Gatherer," and which is described as follows, reference being had to the annexed drawings of the same making part of this specification.

Figure 1, is a top view of the machine. Fig. 2, is a longitudinal section on the line $x$ $x$ of Fig. 1. Fig. 3, is an elevation; the left wheel being removed. Fig. 4 is a sectional view of the fingers and knives.

Similar letters in the several figures refer to corresponding parts.

The nature of my invention and improvement consists in a novel combination and arrangement of an adjustive, pendent bar, to which is secured a row of metallic fingers and a knife or cutter and right angled mortised plates; and in the arrangement of spring conveyer bars, attached to the axletree of the propelling wheel and caused to rotate with the same; by which the stems or stalks of clover heads are forced against the knife, between the fingers, severed and conveyed to a receiver.

A, A, are the supporting and propelling wheels. B B are the side timbers of the frame, in the rear end of which are the bearings of the axletree B′.

C, C, are the shafts to which the animal for drawing the machine is geared.

D, D, are the handles by which the machine is guided.

E are beams of timber which connect the front ends of the side timbers. These parts are arranged in any convenient way.

F F are two mortised right angled metallic plates, in which are secured the journals of the pendent finger bar. The vertical portion F′, of these plates project up through mortises $i$ in the side timbers, and are open or slotted vertically to receive an adjustive bar G to which they are secured.

G, G, are vertical adjustive slides or bars having mortises $g$, $g$, in their upper ends, through which bars and the handles D D screw bolts $c$ $c$ are passed to receive nuts on their inner ends, by which said right angled plates F′ F′ are raised or lowered and held in any required position, the lower ends of the adjustive slides or bars to enter the mortises $i$ in the side timbers, and are susceptible of being raised or lowered with the right angled plates, and fingers, to suit the height of the clover heads, the plates F′ being connected to the adjustive slides or bars G by bolts $c'$, $c'$.

H, H, are oblong mortises in the lower or horizontal portion of the right angled plates F to receive and confine the journals $h$, $h$, of the pendent bar I and allow the same with the knife K, and fingers J to have a movement lengthwise the frame, or toward its front, in order to bring the knife nearer to or farther up from the direct action of the spring conveyer bars in forcing the stems or stalks of the clover heads against the knife. I is a transverse pendent finger bar, secured beneath and parallel with the axle tree, to the right angled plates F, which support and allow it to move back and forth in the mortises H upon its journals $h$ $h$.

J are the fingers made in sections, pointed, and projecting in front beyond the sweep of the conveyer bars, and are fastened to the transverse pendent bar I by screw-bolts and nuts.

K is a blade or knife embedded, or countersunk, in the top of the fingers, and screwed firmly to the same so as to permit the spring conveyer bars P to pass over successively without coming in contact with the cutting edges which is next the points of the fingers.

L, L, are right angled rods, screwed to the underside of the pendent bar I and extending in front of the fingers and vertically through a transverse timber M on the vertical portion of these rods L are formed screws to receive nuts L′, which rest on the transverse timber, for raising or lowering the finger points J, when the pendent bar is raised or lowered, or independent of the pendent bar.

M is a transverse timber, through which the vertical portion of the ends L pass, secured on the side timbers B by screw bolts $m$, passed through mortises $n$ in the same, on the lower ends of which are screwed nuts which allow the said timber M to be moved with the fingers J and pendent bar I to or from the axletree B′, in order to bring the cutting edge of the knife K nearer to or farther from the action of the spring conveyer bars.

P are the spring conveyer bars, arranged at equal distances apart around the axletree B' and are the length of the same between the side timbers B four of which being sufficient for an operative machine, though more may be used. These conveyer bars P are made of wood or other material and are secured to the ends of the spring bars P', by screw bolts $t$; the nuts of which are countersunk in the bars so as not to come in contact with the knife, the center of the springs P', are screwed to the axletree by bolts $p$ and are provided with slits in their ends in which the bolts move to allow the springs P' to contract as the said conveyer bars P revolve over the knife K to sever the stems or stalks of the clover heads.

Q is a receiver into which the heads of clover are conveyed by the conveyer bars P after being severed from the stems or stalks it is fastened to the lower or horizontal portions of the right angled plates, in the rear of the machine, and is made of any suitable material such as hide or leather.

The handles D are sufficiently braced and supported by posts to sustain the plates F and finger bar I.

The operation of the machine will be evident from the foregoing description. The horse being attached to the shafts C C and the fingers J adjusted to the height of the clover he is driven forward which puts the spring conveyer bars P in motion. The stems of clover are received between the fingers against the transverse knife K. The heads of clover which are above the fingers are struck by the conveyer bars and conveyed back into the receiver Q, the stems being severed by the knife.

What I claim as my invention and desire to secure by Letters Patent is—

1. The combination and arrangement of the transverse pendent finger bar I; the mortised right angled plates F; adjustive slide bars G; and knife or cutter K; with the revolving axle tree of spring conveyer bars P, arranged and operating in the manner described, by which the heads of clover are severed from the stems, or stalks, and conveyed to a receiver.

2. I also claim the combination of the right angled rods L fingers J and pendent bar I with the transverse timber M for adjusting the knife and fingers longitudinally and vertically in connection with the spring conveyer bars P as described and represented.

In testimony whereof I have hereunto signed my name before two subscribing witnesses this third day of February 1849.

JOHN HINTON.

Witnesses:
Wm. P. Elliot,
A. E. H. Johnson.

[First Printed 1913.]